Aug. 18, 1970  C. K. BAJPAI ET AL  3,524,990
INVERTER CIRCUIT WITH SATURABLE REACTOR CURRENT LIMITING
Filed Feb. 8, 1967

INVENTOR
Chandra K. Bajpai
Rabindra N. Basu
BY Muir Marshall
MacRae & Lamb
PATENT AGENT

United States Patent Office 3,524,990
Patented Aug. 18, 1970

---

3,524,990
INVERTER CIRCUIT WITH SATURABLE REACTOR CURRENT LIMITING
Chandra K. Bajpai and Rabindra N. Basu, Ottawa, Ontario, Canada, assignors to Northern Electric Company Limited, Montreal, Quebec, Canada
Filed Feb. 8, 1967, Ser. No. 614,735
Int. Cl. H01f 37/02; H03k 3/30; H02k 19/16
U.S. Cl. 307—88                                        2 Claims

ABSTRACT OF THE DISCLOSURE

A parallel inverter circuit having silicon controlled rectifiers in each leg and a saturable reactor in series with each rectifier to limit the current at the instant of switching is modified by magnetically coupling the saturable reactors to ensure that when one of the rectifiers is biased in its reverse direction the corresponding saturable reactor is fully saturated.

---

BACKGROUND OF THE INVENTION

This invention relates to an improvement in inverter circuits for producing alternating current power from a direct current source. Silicon controlled rectifiers (denoted SCR) are frequently used in inverter circuits. Such rectifiers can only be turned off by reversing the current flow through them and in parallel inverter circuits this is frequently accomplished by discharging a capacitor through the forward direction of the rectifier to be switched on and through the reverse direction of the rectifier to be switched off. This capacitive discharge produces a high peak current in a short time interval. Such a current pulse may exceed the maximum permissible rate of rise of current for a silicon controlled rectifier, producing hot spots and eventual device failure. In addition, a high rate of current rise produces a radio frequency voltage in the reactor coils and connecting conductors causing undesirable interference with other equipment.

It is known that the high rate of current rise may be reduced by using a saturable reactor in series with each rectifier device. The saturable reactors form an impedance in series with the rectifiers which is significant only at the instance of switching, at other times the cores are saturated and introduce no significant impedance to the passage of current. A difficulty arises in that the forward and reverse switching currents may not be equal in duration and hence may not magnetize the cores of the saturable reactors by an equal amount. If the core saturation time is made equal to the turn-on time of the rectifier device, the turn-off time, being longer, may lead to the generation of radio frequency interference in the inductor due to the abrupt cessation of current.

SUMMARY

In the inverter circuit of this invention a saturable reactor is used in series with each rectifier as is known in the prior art. The saturable reactors in series with a pair of rectifiers are, however, magnetically coupled with the magnetic phasing arranged so that the flux resulting from the forward conduction of one rectifier reinforces the flux resulting from the reverse conduction of the other rectifier. This arrangement ensures that, even if the turn-on and turn-off times of the rectifying devices are unequal, the cores are always restored to a fully saturated condition after the switching interval.

DESCRIPTION OF THE PREFERRED EMBODIMENTS

Figure 1:
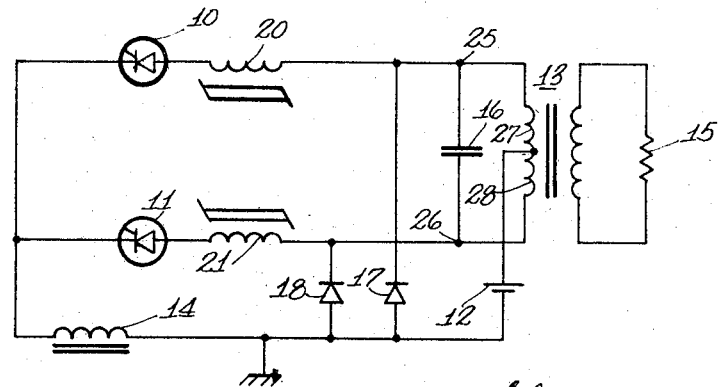
FIG. 1 is a schematic diagram of an inverter circuit known in the prior art.

The type of inverter circuit known in the prior art will first briefly be described with reference to FIG. 1. Two silicon controlled rectifiers 10 and 11 are employed. These rectifiers are triggered from an external circuit (not shown) to operate, essentially in a bistable fashion, so that only one rectifier conducts at any time. A source of DC power, indicated schematically as a battery 12, is connected to the rectifiers in parallel through the two halves 27 and 28 of the primary winding of a transformer 13. The rectifiers are returned to power source 12 through an inductor 14. As the current from battery 12 alternately flows in half windings 27 and 28 the secondary winding of transformer 13 is energized to deliver power to a load 15.

To aid in the switching of the rectifying devices, a capacitor 16 is provided. During the period when SCR 10 is conducting, capacitor 16 charges up to twice the voltage of the power source, due to autotransformer action in the primary of transformer 13, with terminal 26 being positive with respect to terminal 25. At the instant of switching capacitor 16 discharges through SCR 11 in the forward direction and SCR 10 in the reverse direction to aid in the switching off of SCR 10. The inductor 14 is provided to prevent the capacitor being discharged through the negative side of the power source. The time constant of inductor 14 and capacitor 16 is chosen of sufficiently high value to ensure that the reverse current supplied to SCR 10 is sufficient to switch it off. Diodes 17 and 18 are provided to make it possible to feed reactive energy back to the power source and hence enable the inverter to operate at no load. Their function is not related to the invention of this application and they will not be discussed further.

When capacitor 16 is discharged through one of the rectifiers in its forward direction an unduly high rate of current rise may be obtained which may damage the device. In addition, radio frequency interference arising in the coils and conductors may be produced by the abrupt turn-off of one of the rectifying devices. It is known that these disadvantages may be mitigated by the introduction of a pair of saturable reactors 20 and 21 in series with rectifiers 10 and 11, respectively. As is known, the saturable reactors are designed with the characteristics of the magnetic core such that the volt-second product of the discharge of capacitor 16 during the turn-off time of the device approximates to the value required to switch the reactor core from saturation in one direction to saturation in the opposite direction. Since the turn-on and turn-off times of rectifying devices are not, in general, equal, there is no single satisfactory value for saturable reactors in order to remove both the disadvantages mentioned above. Generally, the saturation time is chosen equal to the maximum turn-off time of the rectifying devices used, which results in the generation of some radio frequency interference due to the turn-on time being smaller.

Figure 2:
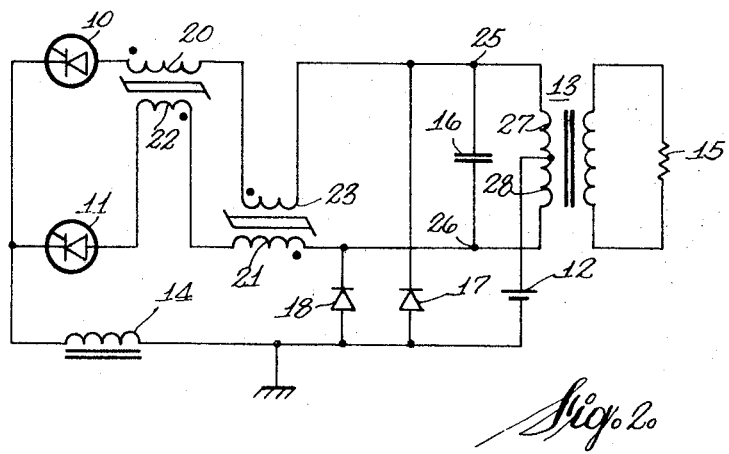
FIG. 2 is a schematic diagram of one embodiment of an inverter circuit according to the invention.

One embodiment of this invention which removes the difficulties discussed above is shown in FIG. 2. In this figure like components bear the same reference numerals as previously used. The embodiment of FIG. 2 is identical to that shown in FIG. 1 with the exception that two additional coils 22 and 23 have been added. Coil 23 is in series connection with rectifying device 10 and saturable reactor 20. It is, however, magnetically coupled to the opposite saturable reactor 21. Similarly, coil 22 is in series connection with rectifying device 11 and saturable reactor 21. It is magnetically coupled to saturable reactor 20. The phasing of the transformer formed by saturable reactor 20 and coil 22 is such that current in the forward direction through rectifying device 11 produces a magnetic flux in the same direction as current in a reverse direction through rectifying device 10. The phasing of the transformer formed by saturable reactor 21 and coil 23 is such that current in the forward direction through rectifying device 10 produces a magnetic flux in the same direction as current in the reverse direction through rectifier 11.

Referring now to the operation of the inverter circuit shown in FIG. 2 with particular reference to the moment of switching consider the situation where rectifier 10 has been in conduction and rectifier 11 has been switched off. Accordingly, capacitor 16 will have been charged up to twice the voltage of power source 12 with terminal 26 being positive with respect to terminal 25. When rectifying device 11 is switched on capacitor 16 will discharge through the path formed by saturable reactor 21, rectifying device 11, rectifying device 10 (in its reverse direction) and saturable reactor 20. If it is assumed that the turn-off time of rectifying device 10 is relatively short then the current flow through this device may not be sufficient to switch saturable reactor 20 to its opposite saturated state. The current flow through coil 22, however, will continue during the forward conduction of rectifier 11 and will be sufficient to switch reactor 20 to its opposite saturated state. Thus, the inverter circuit of FIG. 2 ensures that the cores of the saturable reactors in series with the rectifying devices are always retained in a saturated condition at the conclusion of the switching operation.

Figure 3:
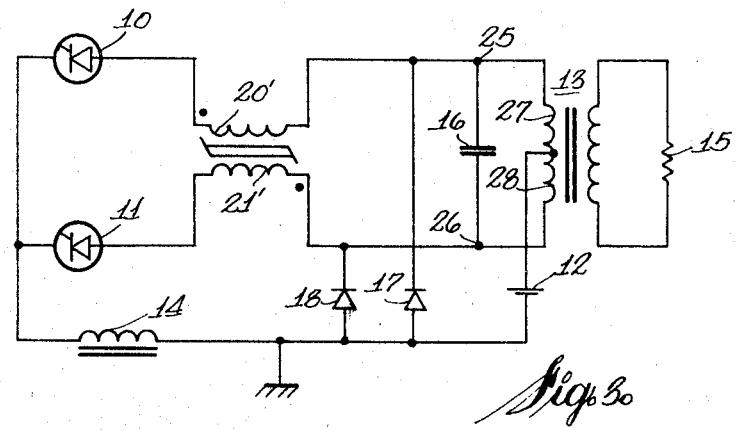
FIG. 3 is a schematic diagram of the preferred embodiment of the inverter circuit of this invention.

Referring now to FIG. 3, there is shown the preferred embodiment of an inverter circuit according to this invention. As before, similar reference numerals are used to denote similar components. This circuit may be seen to differ from that shown in FIG. 1 in that saturable reactors 20' and 21' are provided which are magnetically coupled. Alternatively expressed, this circuit may be said to differ from that shown in FIG. 2 in that coils 20 and 23 are combined as a single inductor and coils 21 and 22 are combined as another inductor.

The operation of this circuit will be readily apparent. Again consider the instant of switching after the period when rectifying device 10 has been in conduction and rectifying device 11 has been turned off. When rectifying device 11 is turned on, capacitor 16 will discharge through the path provided by coil 21', rectifying device 11, rectifying device 10 (in its reverse direction) and coil 20'. Even if the reverse current through rectifying device 10 is insufficient in duration to switch the magnetic core of reactor 20', the core will still be switched due to the forward current through rectifying device 11.

Thus there has been described a novel inverter circuit using magnetically coupled saturable reactors in series with each rectifying device. While two specific embodiments of the invention have been disclosed it will be clear that the scope of this invention is not limited by the particular embodiment disclosed but is defined by the appended claims.

We claim:

1. In an inverter circuit having first and second controlled rectifier devices arranged in parallel for alternate conduction and having a first and a second saturable reactor means having a common saturable core and each connected in series with the respective rectifier, the improvement comprising magnetic coupling between said first and second saturable reactors, the reactor means being oriented so as to cause the flux resulting from the forward current of said first rectifier to reinforce the flux resulting from the reverse current of said second rectifier and vice versa.

2. An inverter circuit comprising a transformer having a center-tapped primary winding and a secondary winding connected to a load, first and second controlled rectifier devices connected one to each end of said primary winding for alternate conduction and having a first and a second saturable reactor each connected in series with the respectively designated rectifier, a power source connected between the center tap of said primary winding and a common junction of said first and second rectifiers, a first coil connected in series with said first rectifier and saturable reactor and magnetically coupled to said second saturable reactor, and a second coil connected in series with said second rectifier and saturable reactor and magnetically coupled to said first saturable reactor, the resulting flux conditions in the cores of said first and second saturable reactors being determined only by the currents flowing in said reactors and said first and second coils, and, magnetic coupling means arranged between said first coil and said second saturable reactor and between said second coil and said first saturable reactor being so as to cause the flux resulting from the forward current of said first rectifier to reinforce the flux resulting from the reverse current of said second rectifier and vice versa.

References Cited
UNITED STATES PATENTS

| 3,242,413 | 3/1966 | Hardies | 307—282 XR |
| 3,267,356 | 8/1966 | Schaefer | 307—314 XR |
| 3,317,816 | 5/1967 | Wilting | 307—284 XR |
| 3,374,440 | 3/1968 | Kawai et al. | 307—282 XR |

BERNARD KONICK, Primary Examiner

G. M. HOFFMAN, Assistant Examiner

U.S. Cl. X.R.

307—270, 314